United States Patent
Yang

(10) Patent No.: US 6,688,040 B1
(45) Date of Patent: Feb. 10, 2004

(54) TOMBSTONE FLOWER SADDLE

(76) Inventor: Rong Teai Yang, 222 Nautical Winds, Lexington, NC (US) 27292

( * ) Notice: Subject to any disclaimer, the term of this patent is extended or adjusted under 35 U.S.C. 154(b) by 0 days.

(21) Appl. No.: 10/335,672

(22) Filed: Jan. 2, 2003

(51) Int. Cl.[7] ................................. A01G 5/00
(52) U.S. Cl. ..................... 47/41.1; 47/41.12
(58) Field of Search ............... 47/41.01, 41.14, 47/41.13, 41.1, 41.12

(56) References Cited

U.S. PATENT DOCUMENTS

| | | | | |
|---|---|---|---|---|
| 2,261,326 A | * | 11/1941 | Atkisson et al. | 47/41.13 |
| 2,637,143 A | * | 5/1953 | Reynolds et al. | 47/41.13 |
| 2,815,606 A | * | 12/1957 | Quackenbush | 47/41.12 |
| 2,891,354 A | * | 6/1959 | Smithers | 47/41.01 |
| 4,640,045 A | * | 2/1987 | Nesbitt et al. | 47/66 |
| 5,072,542 A | * | 12/1991 | Quackenbush | 47/41.01 |
| 5,454,189 A | * | 10/1995 | Graham et al. | 47/41.12 |
| 5,966,865 A | * | 10/1999 | Jones | 47/41.01 |
| 5,996,813 A | * | 12/1999 | Hendrix et al. | 211/13.1 |
| 6,012,250 A | * | 1/2000 | Ray | 47/41.01 |

* cited by examiner

Primary Examiner—Son T Nguyen
(74) Attorney, Agent, or Firm—Schwartz Law Firm, P.C.

(57) ABSTRACT

A flower saddle includes a base adapted for securing the flower saddle to a supporting structure. A foam block is located on the base, and is adapted for receiving stems of flowers and for holding the flowers in a desired position for display. A cage includes openwork covering the foam block. The openwork defines access points through which the stems of the flowers are received into the foam block.

11 Claims, 6 Drawing Sheets

TOMBSTONE FLOWER SADDLE

TECHNICAL FIELD AND BACKGROUND OF INVENTION

This application relates to a tombstone flower saddle. The invention provides a secure and convenient means for mounting and displaying flowers and/or other decorations or commemorative items on a tombstone.

It is customary to place flowers on or adjacent a tombstone or other grave marker of a loved one. This, however, creates a problem for cemetery caretakers responsible for maintaining the grounds, and mowing and trimming the grass around the tombstones. As a result, many cemeteries have rules requiring that decorations such as flowers, plants, and the like be removed from the ground prior to the days that the mowing and trimming is to be done. In many cases, relatively fresh and expensive arrangements which are not removed are either damaged by the lawn equipment, given away, or discarded.

To address this problem, a flower planter or saddle was designed for mounting on top of the tombstone. While these prior art products are effective in getting the flowers and other decorations off the ground, they generally sit in a relatively unstable condition and often inadvertently fall from the tombstone due to slight wind, rain, and/or snow, or even the weight of the arrangement itself. When fresh flowers located in the planter or saddle die out, they are generally replaced with new flowers. After forming several arrangements over a period of time, the flower-retaining element of the planter or saddle quickly becomes worn and loses its ability to effectively hold and display the arrangement.

SUMMARY OF INVENTION

Therefore, it is an object of the invention to provide a flower saddle which is especially applicable for use on a supporting structure, such as a tombstone or easel, to display cut flowers and/or other decorations or commemorative items.

It is another object of the invention to provide a flower saddle which securely and conveniently mounts to the supporting structure.

It is another object of the invention to provide a flower saddle which obviates the need to return and remove the flowers from the grave site prior to a caretaker's mowing and trimming day.

It is another object of the invention to provide a flower saddle which effectively secures the flower-retaining element of the saddle in place when the saddle is mounted on the supporting structure.

It is another object of the invention to provide a flower saddle which is readily secured to a tombstone and tightened using an attachment line or wire.

It is another object of the invention to provide a flower saddle which includes grips for engaging and frictionally holding the saddle to the tombstone.

It is another object of the invention to provide a flower saddle which will not damage or create rust marks on the surface of the tombstone.

It is another object of the invention to provide a flower saddle which is molded of a plastic material.

It is another object of the invention to provide a flower saddle which is adjustable to fit any size tombstone.

It is another object of the invention to provide a flower saddle which is lightweight and durable.

It is another object of the invention to provide a flower saddle which facilitates precise placement of flowers in an arrangement displayed in the saddle.

It is another object of the invention to provide a flower saddle which is conveniently assembled and disassembled.

These and other objects of the present invention are achieved in the preferred embodiments disclosed below by providing a flower saddle including a base adapted for securing the flower saddle to a supporting structure. A foam block is located on the base, and is adapted for receiving stems of cut flowers and for holding the flowers in a desired position for display. A cage includes openwork covering the foam block. The openwork defines access points through which the stems of the cut flowers are received into the foam block.

The flower saddle is applicable for holding flowers and/or other decorations and/or small commemorative items. The flowers may be artificial or cut natural.

According to another preferred embodiment of the invention, the base includes first and second integrally-formed, resilient legs bowed outwardly and cooperating when pulled apart to releasably clamp the base to the supporting structure.

According to another preferred embodiment of the invention, the first and second legs have respective integrally-formed feet adapted for engaging the supporting structure.

According to another preferred embodiment of the invention, the feet define respective through-bores for receiving an attachment line adapted for extending around the supporting structure to further secure the flower saddle to the supporting structure.

According to another preferred embodiment of the invention, the cage defines an open bottom for receiving the foam block.

According to another preferred embodiment of the invention, the cage has a stiffening band located at its open bottom.

According to another preferred embodiment of the invention, the base includes a support tray adapted for carrying the foam block. The support tray has a generally flat bottom and a low rim located adjacent the stiffening band of the cage.

According to another preferred embodiment of the invention, resilient tabs are formed with the low rim of the support tray and include respective shoulders engaging the stiffening band of the cage to releasably attach the tray and the cage together.

In another embodiment, the invention is a flower saddle including a base adapted for securing the flower saddle to a supporting structure. The base includes first and second spaced-apart pairs of integrally-formed resilient legs bowed outwardly and cooperating when pulled apart to releasably clamp the base to the supporting structure. A foam block is located on the base, and is adapted for receiving stems of cut flowers and for holding the flowers in a desired position for display. A cage includes openwork covering the foam block. The openwork defines access points through which the stems of the cut flowers are received into the foam block.

In yet another embodiment, the invention is a method for displaying flowers on a tombstone. The method includes the steps of mounting a base of a flower saddle on a top of the tombstone. The flower saddle includes a foam block positioned on the mounting base and a cage including openwork covering the foam block. Stems of cut flowers are inserted into the foam block through access points defined by openings in the cage According to another preferred embodiment of the invention, the step of mounting the flower saddle includes passing an attachment line through openings in the base and around the tombstone to further secure the flower saddle to the tombstone.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
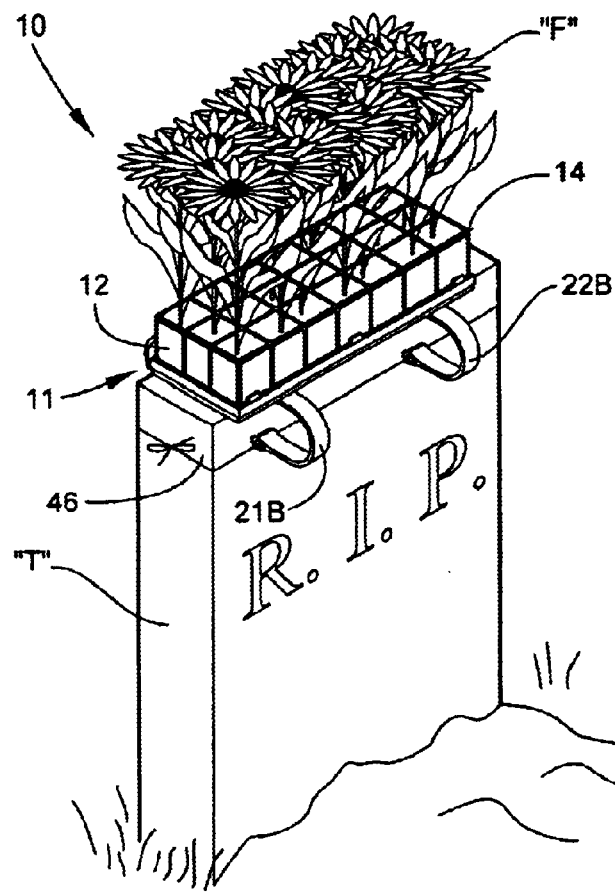
FIG. 1 is an environmental perspective view of a flower saddle according to one preferred embodiment of the invention, and showing the flower saddle mounted on the top of a tombstone and displaying an arrangement of cut flowers.
Figure 2:
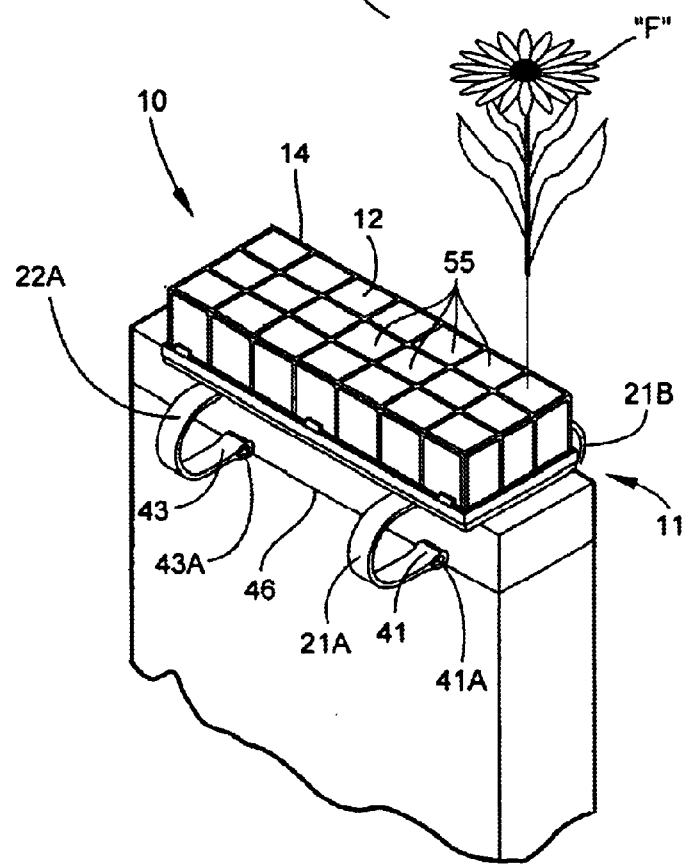
FIG. 2 is a further perspective view of the flower saddle mounted on the tombstone, and demonstrating the insertion of a single flower through an access point defined by openwork of the cage.
Figure 3:
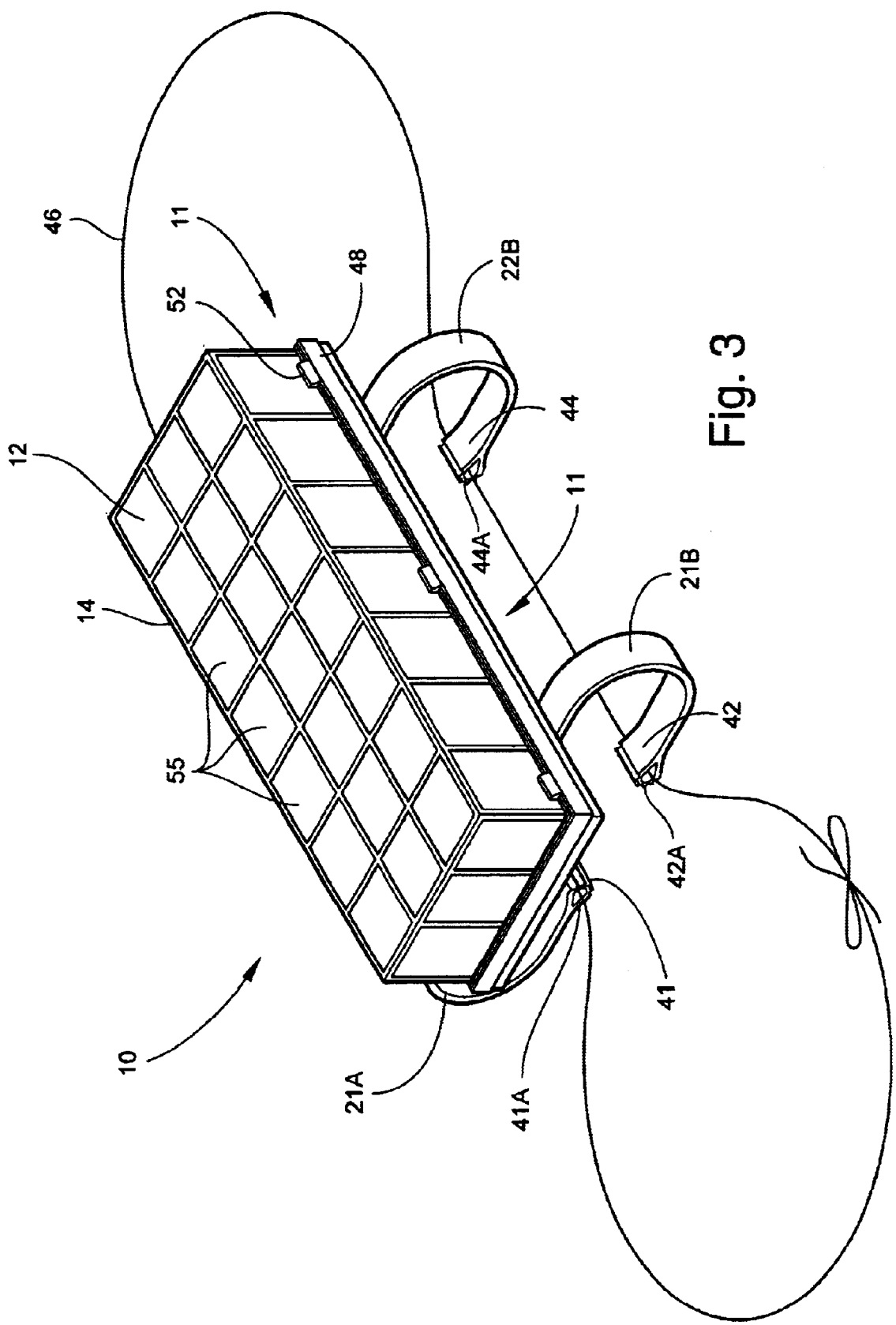
FIG. 3 is perspective view of the flower saddle removed from the tombstone.

Referring now specifically to the drawings, a flower saddle according to the present invention is illustrated in FIGS. 1, 2, and 3, and shown generally at reference numeral 10. The flower saddle 10 is especially applicable for mounting on a supporting structure, such as a tombstone "T", to display a decorative arrangement including artificial or natural cut flowers "F" and/or plants, and/or commemorative items, such as photo and message holders, small novelty items, and the like.

Figure 4:
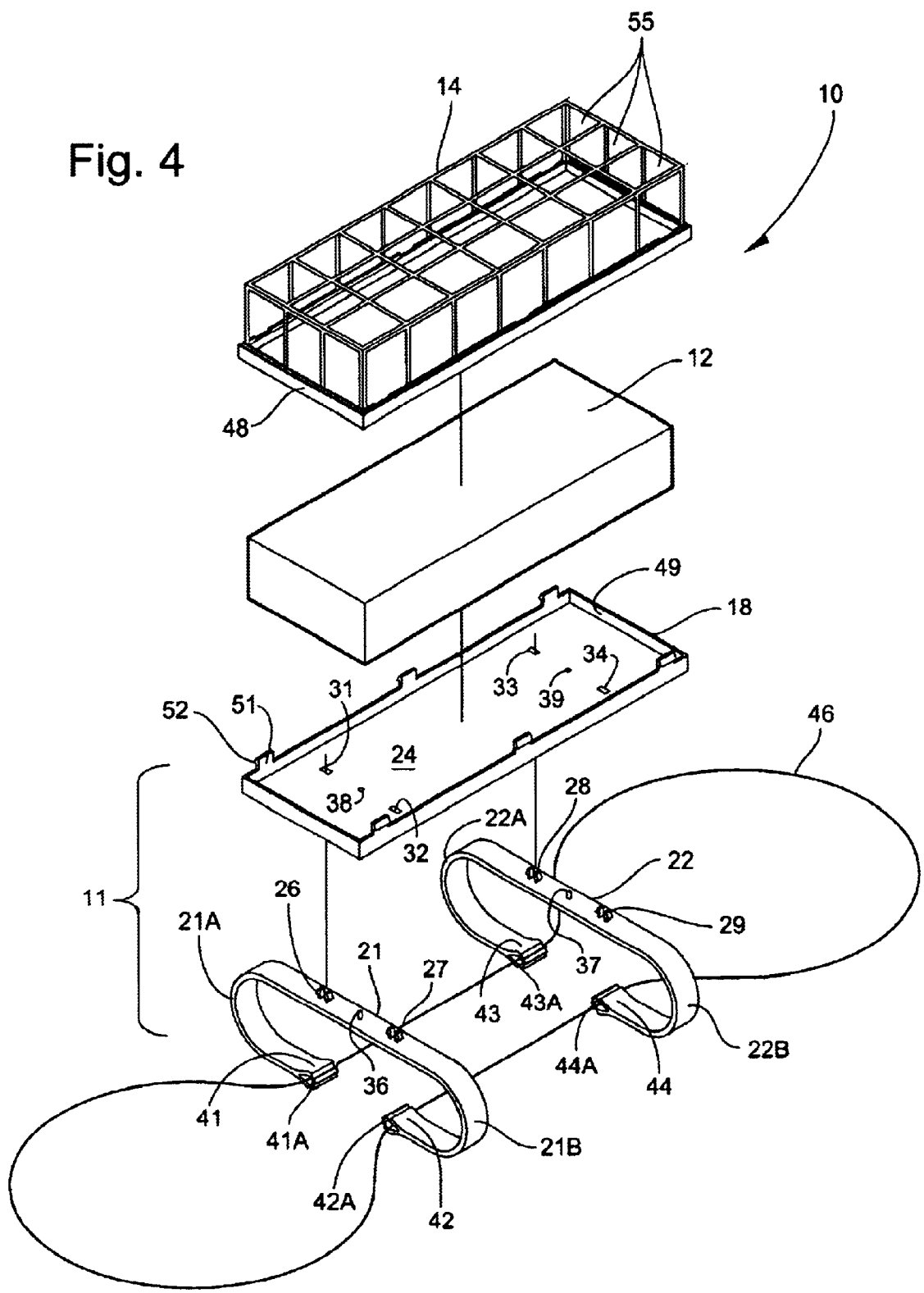
FIG. 4 is an exploded view of the flower saddle.
Figure 5:
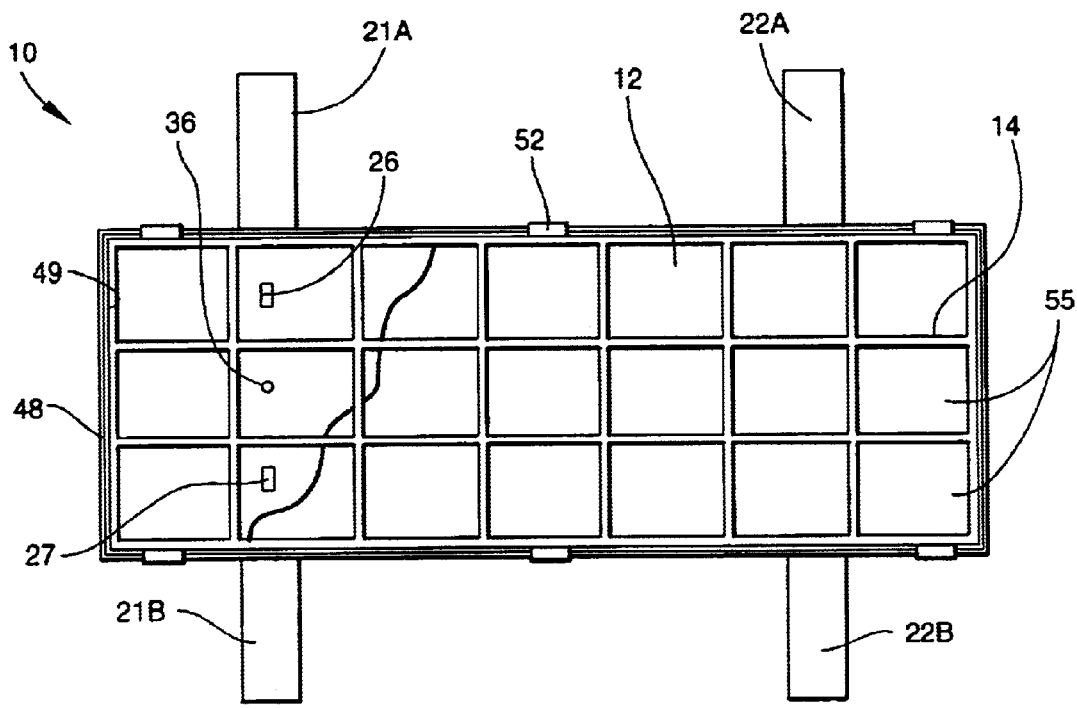
FIG. 5 is a top plan view of the flower saddle with a portion of the foam block cut away to illustrate the openings in the base for receiving fasteners of the resilient legs.
Figure 6:
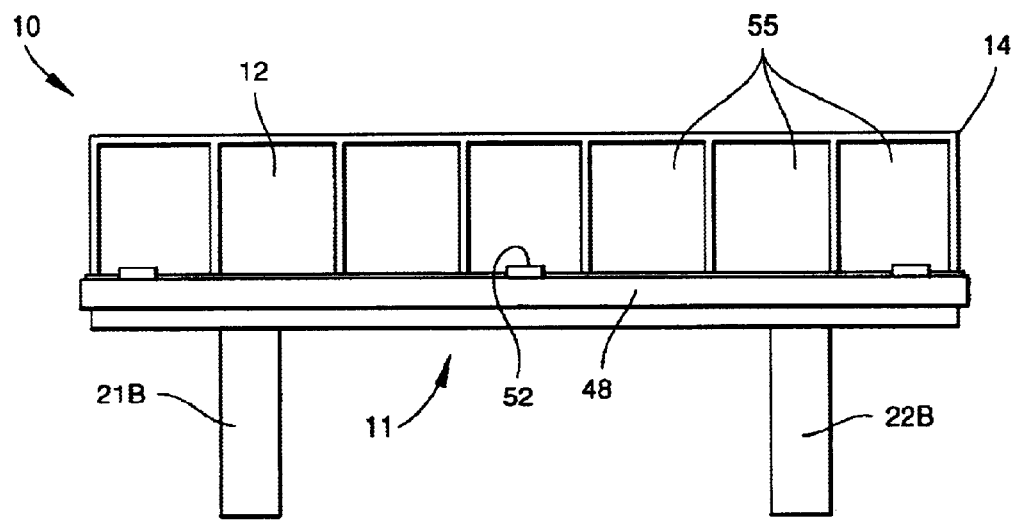
FIG. 6 is a side elevational view of the flower saddle.
Figure 7:
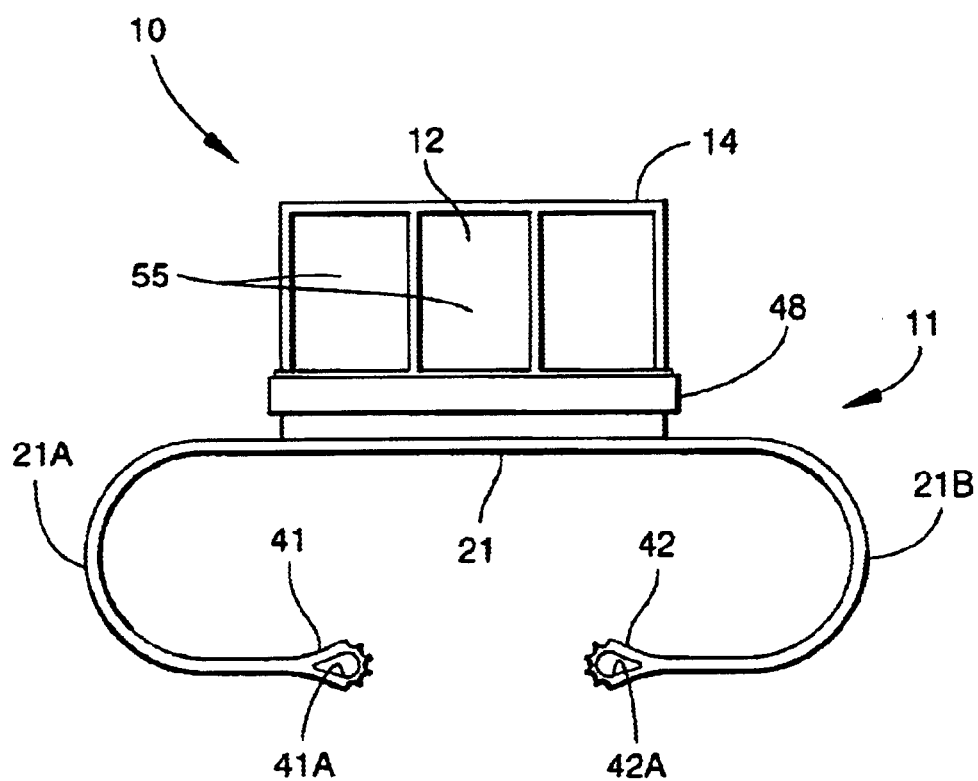
FIG. 7 is an end view of the flower saddle.

As best shown in FIG. 4, the flower saddle 10 has a base 11, a lightweight polyurethane foam block 12 located on the base 11, and a cage 14 including openwork attached to the base 11 and covering the foam block 12. The base 11 comprises a support tray 18 which carries the foam block 12, and spaced-apart pairs 21 and 22 of resilient legs 21A, 21B and 22A, 22B. The resilient legs 21A, 21B and 22A, 22B of each pair are integrally formed together in a generally C-shape, and are releasably attached to a flat bottom 24 of the support tray 18 by resilient pinch fasteners 26, 27, 28, and 29. The pinch fasteners 26-29 extend through respective openings 31, 32, 33, and 34 formed in the tray bottom 24, and have tapered shoulders for engaging the bottom 24 to lock the pairs of legs 21, 22 and the support tray 18 together. Preferably, vertical pegs 36 and 37 are formed with each pair of legs 21 and 22 and extend through openings 38 and 39 in the tray bottom 24 to further align the support tray 18 and legs 21, 22.

The resilient legs 21A, 21B and 22A, 22B are bowed outwardly, and are pulled slightly apart in-use in order to fit the flower saddle 10 on top of the tombstone "T", as shown in FIGS. 1 and 2. The legs 21 A, 21 B and 22A, 22B have respective integrally-formed feet 41, 42, 43, and 44 adapted for engaging the tombstone "T", and which may include friction ridges (not shown) for increased gripping. The feet 41-44 define through-bores 41A, 42A, 43A, and 44A which receive a flexible nylon attachment line 46 applicable for extending around the tombstone "T". The attachment line 46 is tied at its free ends and cooperates with the resilient legs 21A, 21B and 22A, 22B to securely mount the flower saddle 10 to the tombstone "T".

The cage 14 fits over the foam block 12 and attaches to the support tray 18 to sandwich and retain the foam block 12 to the base 11. The cage 14 includes an open bottom which receives the foam block 12, and a perimeter stiffening band 48 formed at the open bottom and residing closely adjacent a low rim 49 of the support tray 18. The low rim 49 includes resilient tabs 51 with respective shoulders 52 engaging the stiffening band 48 of the cage 14 to releasably attach the tray 18 and the cage 14 together, thereby creating a protective and supporting enclosure around the foam block 12.

Referring to FIGS. 2, 5, 6, and 7, the openwork of the cage 14 defines access points 55 through which the stems of the flowers "F" are received into the foam block 12. The predefined access points 55 facilitate precise placement of flowers "F" within an arrangement displayed in the saddle 10. The foam block 12 holds the flowers "F" in a desired fixed condition for display, and is itself securely retained by the surrounding cage 14 and base 11. Preferably, the cage 14, support tray 18, and pairs of legs 21, 22 are all manufactured of a durable, lightweight plastic.

Figure 8:
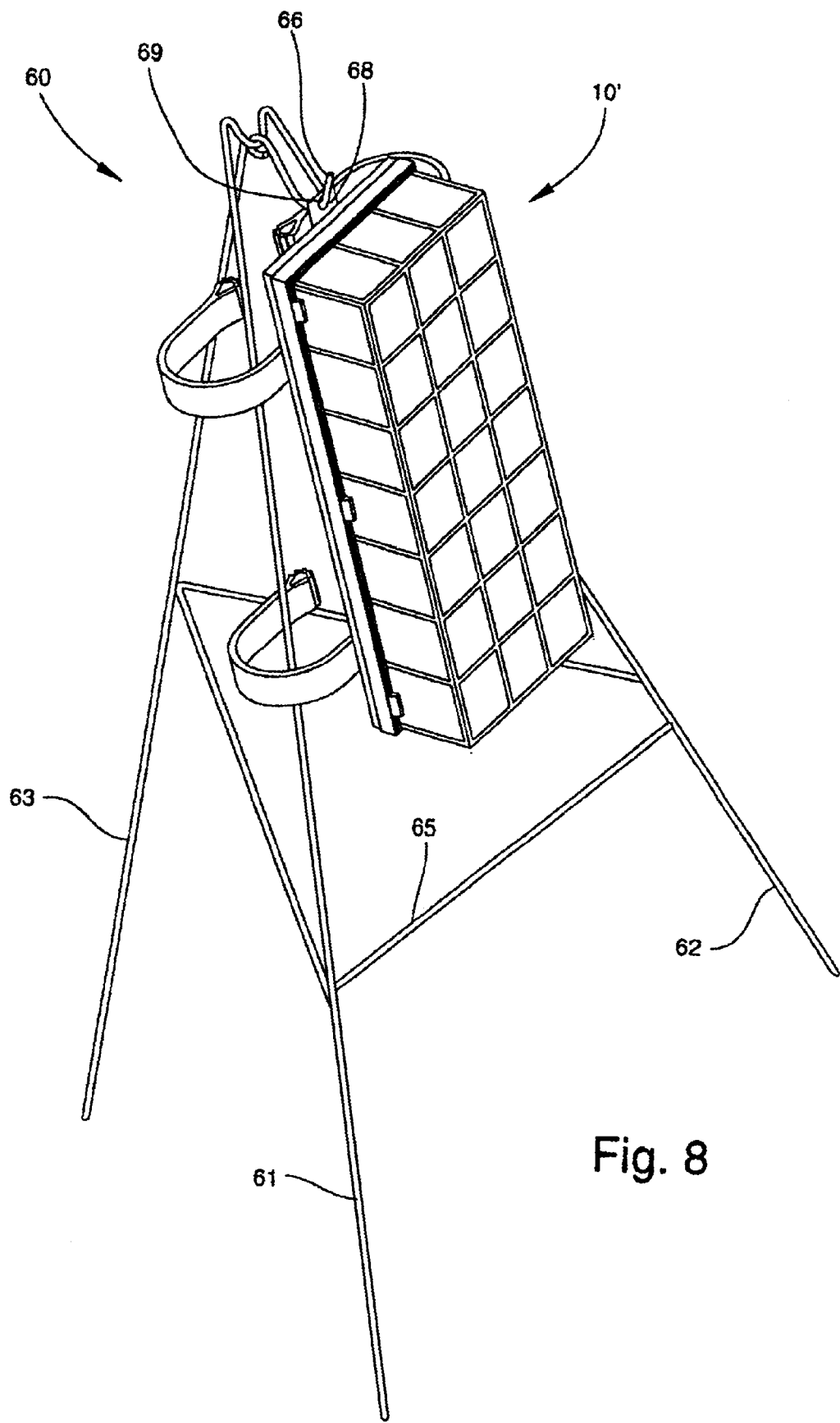
FIG. 8 is a perspective view of the flower saddle mounted on a self-standing easel.

As shown in FIG. 8, the flower saddle 10' is applicable for mounting on other supporting structure, such as a conventional self-standing easel 60. The easel 60 includes three legs 61, 62, and 63 spaced-apart by bracing 65, and a hook 66 formed with a top end of the rear leg 63. A tab 68 is formed with the base of the flower saddle 10' and defines a hole 69 for receiving the hook 66 to suspend the flower saddle 10' from the easel 60.

A flower saddle is described above. Various details of the invention may be changed without departing from its scope. Furthermore, the foregoing description of the preferred embodiment of the invention and best mode for practicing the invention are provided for the purpose of illustration only and not for the purpose of limitation-the invention being defined by the claims.

I claim:

1. A flower saddle, comprising:
   (a) a base adapted for securing said flower saddle to a supporting structure, and comprising first and second integrally-formed, resilient legs bowed outwardly and cooperating when pulled apart to releasably clamp said base to the supporting structure, and said first and second legs comprising respective integrally-formed feet adapted for engaging the supporting structure, and defining respective through-bores;
   (b) an attachment line passing through the through-bores in said feet and adapted for extending around the supporting structure to further secure said flower saddle to the supporting structure;
   (c) a foam block located on said base, and adapted for receiving stems of flowers and for holding the flowers in a desired position for display; and
   (d) a cage comprising openwork covering said foam block, and defining access points through which the stems of the flowers are received into said foam block.

2. A flower saddle according to claim 1, wherein said cage defines an open bottom for receiving said foam block.

3. A flower saddle according to claim 2, wherein said cage comprising a stiffening band located at the open bottom of said cage.

4. A flower saddle according to claim 3, wherein said base comprises a support tray adapted for carrying said foam block, and having a generally flat bottom and a low rim located adjacent the stiffening band of said cage.

5. A flower saddle according to claim 4, and comprising resilient tabs formed with the low rim of said support tray and including respective shoulders engaging the stiffening band of said cage to releasably attach said tray and said cage together.

6. A flower saddle, comprising:
 (a) a base adapted for securing said flower saddle to a supporting structure, and comprising first and second spaced-apart pairs of integrally-formed resilient legs bowed outwardly and cooperating when pulled apart to releasably clamp said base to the supporting structure, and, said first and second pairs of legs comprising respective integrally-formed feet adapted for engaging the supporting structure, and defining respective through-bores;
 (b) an attachment line passing through the through-bores in said feet and adapted for extending around the supporting structure to further secure said flower saddle to the supporting structure;
 (c) a foam block located on said base, and adapted for receiving stems of flowers and for holding the flowers in a desired position for display; and
 (d) a cage comprising openwork covering said foam block, and defining access points through which the stems of the flowers are received into said foam block.

7. A flower saddle according to claim 6, wherein said cage defines an open bottom for receiving said foam block.

8. A flower saddle according to claim 7, wherein said cage comprising a stiffening band located at the open bottom of said cage.

9. A flower saddle according to claim 8, wherein said base comprises a support tray adapted for carrying said foam block, and having a generally flat bottom and a low rim located adjacent the stiffening band of said cage.

10. A flower saddle according to claim 9, and comprising resilient tabs formed with the low rim of said support tray and including respective shoulders engaging the stiffening band of said cage to releasably attach said tray and said cage together.

11. A flower saddle according to claim 10, wherein said first and second pairs of legs include respective fasteners for releasably attaching said first and second pairs to the flat bottom of said support tray.

* * * * *